Feb. 7, 1967

P. GAUTHIER 3,302,220

BOX-MATTRESSES

Filed March 24, 1965

INVENTOR
Pierre Gauthier
By
Sparrow and Sparrow
ATTORNEYS

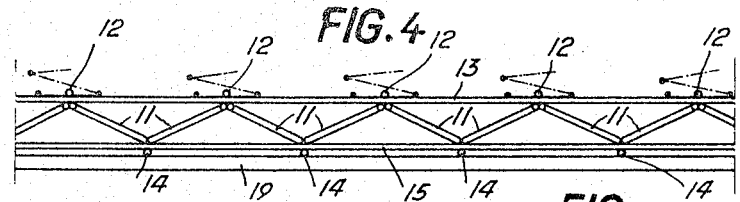
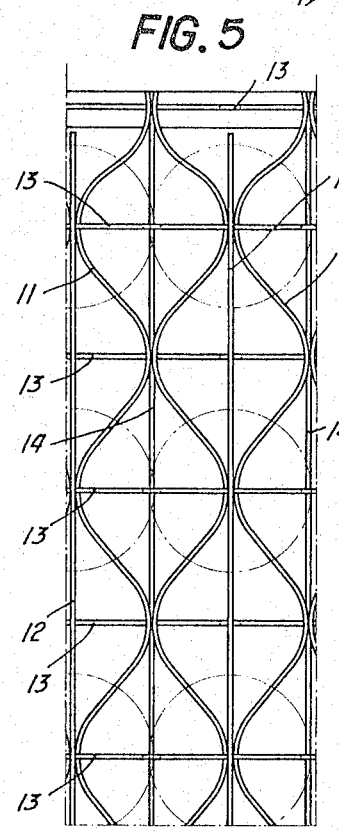
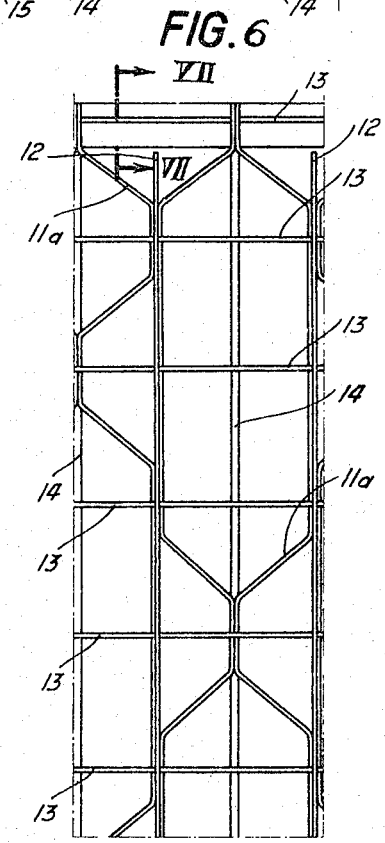
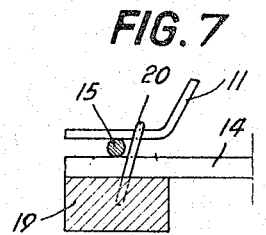
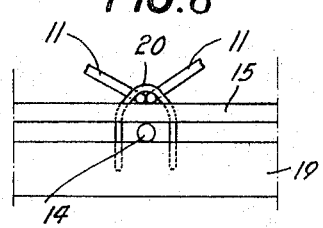
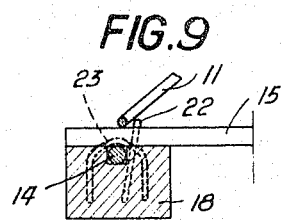
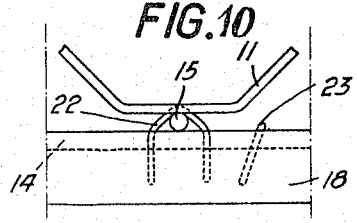

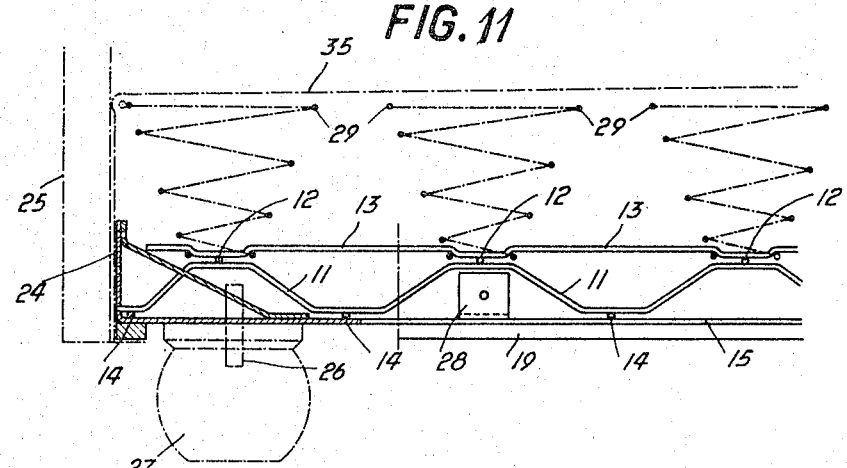
FIG. 11
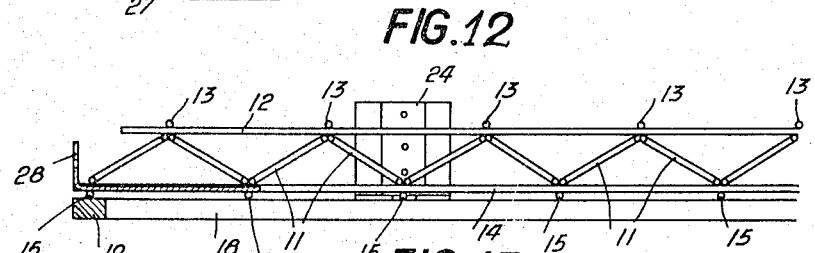
FIG. 12
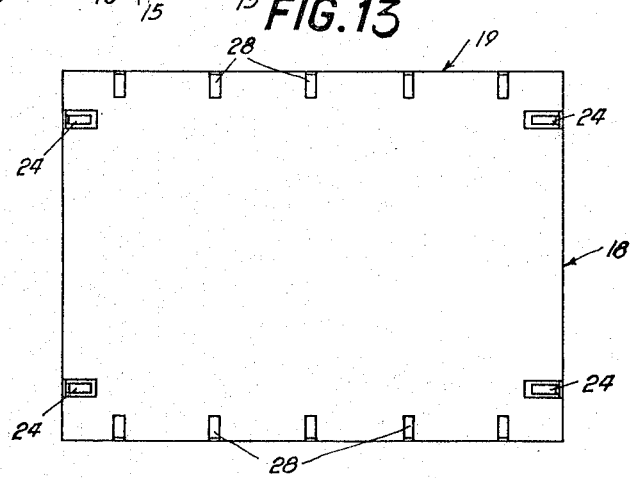
FIG. 13
FIG. 14
INVENTOR
Pierre Gauthier
By Sparrow and Sparrow
ATTORNEYS United States Patent Office 3,302,220
Patented Feb. 7, 1967

3,302,220
BOX-MATTRESSES
Pierre Gauthier, 22 Rue de Villeneuve,
Garches, Seine-et-Oise, France
Filed Mar. 24, 1965, Ser. No. 442,382
Claims priority, application France, Mar. 25, 1964,
968,612, Patent 1,398,056; Mar. 4, 1965, 7,894
2 Claims. (Cl. 5—246)

Mattresses of the so-called "box-mattress" type consist, as is well known, of a supporting structure or box-frame with wooden side members and cross-members, said box-frame being designed to support a flexible structure made of springs of various shapes (cone or double cone springs) which can be interconnected in a number of different ways (tying with string or wire, twisted strip and the like). The peripheral wood members of the supporting frame have variable heights depending on the presentation of the mattress.

There also exist the so-called steel frame mattresses which consist of an outer framework of rolled or structural steel members over which is stretched a flexible sheet which is usually of metal and constructed according to any one of various methods.

Each of the two main classes of mattresses which are at present known has advantages and disadvantages and the present invention relates to mattresses of the class first mentioned, namely the box-mattress type consisting of a substructure which supports a spring structure and which will be designated hereinafter as the "supporting frame."

This invention is characterized in that the supporting frame, instead of being made of wood, consists of a lightweight metal framework or slab of open-work structure which is formed of two series of lattice beams arranged, for example, at right angles to each other and comprising common elements so as to define an upper flat network and a lower flat network.

In the preferred forms of embodiment of the invention, the novel mattress is further characterized by the following features and combinations thereof:

(1) The elements forming the beams (frame members and lattice-work) are straight and cambered steel wires.

(2) The junction between beam elements and between beams is effected by welding, fastening with clips, binding and the like.

(3) The points of junction of the elements in the two flat networks defined by the said elements are not in vertically opposite relation (the result thereby achieved being that, in the case of joining by welding, all of the elements which form the supporting metal framework, or slab, can be welded together in a single operation).

(4) The elbows formed by the oblique undulated steel wires which constitute coupling means between the two flat networks which define the body of the supporting frame are provided with rounded portions of sufficiently long radius to permit of continuous fabrication of the said wires by means of suitable machines.

(5) In an alternative form, one undulation out of two of the said undulated wires is dispensed with.

(6) The complete assembly of lattice beams is associated with thin downwardly-opening angle-iron members so as to form the short sides and long sides and with upwardly-opening angle-iron members so as to form the top of the head-end of the mattress, the said angle-iron members being adapted to contain wood battens to which can be attached, either by nailing or fastening with clips, panelling materials, upholstery fabrics and the like.

(7) The wood battens are secured within their respective angle-iron members either by glueing or by local pinching of the angleiron flanges.

(8) In an alternative form, the wood battens which are provided for the purpose of fixing thereon panelling materials or upholstery fabrics and the like are bare and in direct contact with steel wires of the lower portion of the supporting frame to which the said wires are attached by means of staples.

(9) The side wire of the lower flat network of the supporting frame is fitted with play inside a longitudinal groove which is formed within the top face of the corresponding batten, whereas the wires which are at right angles to the said side wire of the said lower flat network rest directly on the batten and are joined thereto by means of staples.

(10) The short sides of the supporting frame are each provided with triangular corner-brackets which are fixed to the last transverse wires of the lower flat network, the said triangular corner-brackets being intended to be fitted, on the one hand, with guides for the sliding engagement of the head-boards and tail-boards and, on the other hand, with the feet for supporting the mattress.

(11) Feet, which can if necessary be folded back and locked in position, are fixed on gusset-plates which are preferably joined by welding to the corners of the supporting frame or slab.

(12) In an alternative form, the supporting feet are mounted on the triangular corner-brackets either directly by screwing on the said corner-brackets or simply by fitting within flexible split rings which are fixed on the aforesaid corner-brackets.

(13) Each long side of the supporting frame is provided with right-angle brackets which are fixed to the last two longitudinal side wires of the lower flat network, the said right-angle brackets being designed to be fitted, for example, with decorative means.

(14) The upper flat network of the supporting frame is provided, at the points of intersection of the wires which form the said network, with means for the rapid assembly of the mattress springs, the said springs being, for example, either cone springs or double-cone springs.

(15) The means for rapid assembly of the mattress springs consist of annular seating members which are fixed at the points of intersection of the steel wires.

(16) The spring seating members, which can be formed either of plastic material or sheet metal, are provided with a system of slots whereby the said spring seating members can be secured to the steel wires by bayonet-type coupling.

(17) The spring seating members have the shape of open rings so as to afford a certain degree of flexibility.

(18) The spring seating members are coated with sound-proofing material.

Further particular features and characteristics of the invention will be brought out by the description which now follows and which relates to a few examples of construction of the metallic supporting frame, or slab, of a so-called box-mattress, reference being made in this description to the accompanying drawings, in which:

FIG. 4 is a view in vertical longitudinal cross-section of an alternative form of embodiment of the supporting frame;

FIG. 5 is a plan view of a portion of the supporting frame of FIG. 4;

FIG. 6 is a plan view which is similar to the preceding and showing an alternative form of embodiment of the supporting frame;

FIG. 7 is a vertical sectional view along the line VII—VII of FIG. 6;

FIG. 8 is a view taken at right angles to FIG. 7;

FIG. 9 is a vertical sectional view of one of the short sides (head end or foot end) of the supporting frame;

FIG. 10 is a view taken at right angles to FIG. 9;

FIG. 11 is a view in partial vertical cross-section of one end (head or foot) of the supporting frame with a certain number of cone springs of the mattress and one of the feet;

FIG. 12 is a sectional view at right angles to FIG. 11;

FIG. 13 is a plan view and on a smaller scale of a supporting frame fitted with the members which are shown in FIGS. 11 and 12;

FIG. 14 is a detail plan view of FIG. 11;

Figure 1:
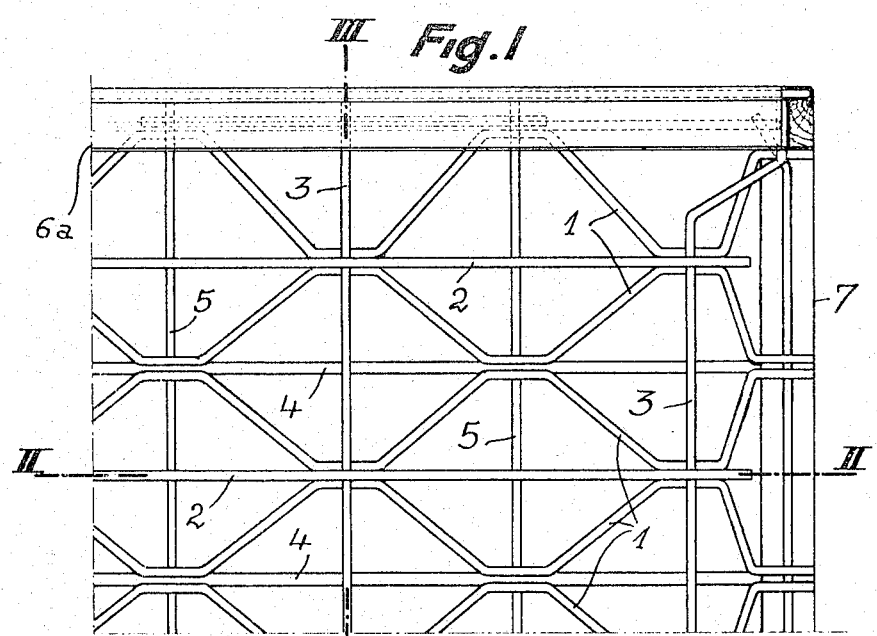
FIG. 1 is a plan view of a portion of the supporting frame of the mattress.
Figure 2:
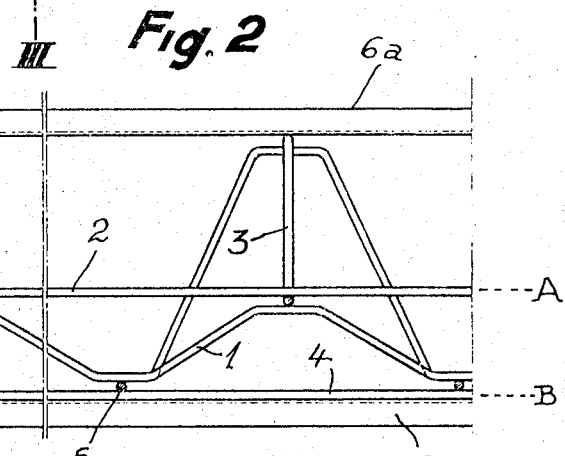
FIG. 2 is a partial view of the supporting frame in vertical transverse cross-section along the line II—II of FIG. 1.
Figure 3:
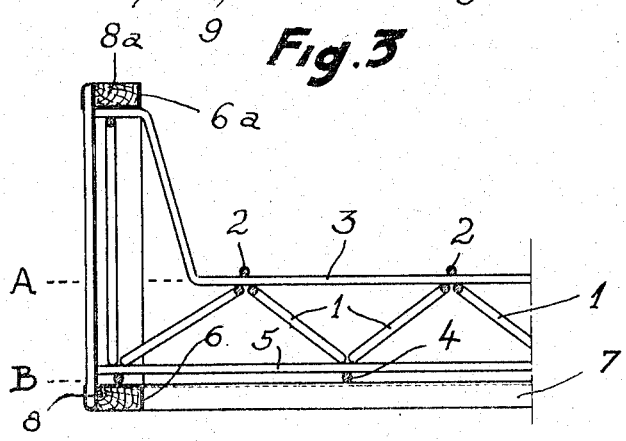
FIG. 3 is a partial view in vertical longitudinal cross-section along the line III—III of FIG. 1.

As can be seen from the drawings, the slab assembly which serves as a supporting frame for the improved mattress in accordance with the invention is in fact an open structural framework which is formed by two series of lattice beams arranged, for example, at right angles to each other and comprising common elements so as to define a top plane (flat network) A and a bottom plane (flat network) B.

The elements which go to make up the said lattice beams are straight and cambered steel wires 1, 2, 3, 4, 5 which are joined together by welding, fastening by means of clips, binding and so forth, the points of junction between these elements in the planes A and B being displaced relatively to each other in the vertical plane with the result that in the case of joining by welding, for example, all the elements can be welded together in a single operation.

The assembly which consists of lattice beams consists, in the case of the short side, of thin angle-iron members 6, 6a, and, in the case of the long sides, of thin angle-iron members 7 which are open on the outside and intended to be fitted with wood battens 8, 8a and 9 respectively.

The aforesaid battens are secured within their respective angle-irons either by glueing or by local pinching of the flanges, etc., and serve to fix by nailing, fastening with clips and so forth, panelling materials, upholstery fabrics and the like.

The supporting frame which has just been described in the foregoing can be fitted with feet which are fixed on gusset-plates of thin steel sheet which are in turn secured to the four corners of the supporting frame, for example by welding. The said feet can be of the folding type with simple positional locking so as to permit of easy transportation.

A metal supporting frame of this type is of smaller depth than the conventional wood frame but provides the same range of elastic flexibility and is 15 to 20% lighter in weight. The novel supporting frame has a higher coefficient of safety than that of the wood frame and radically eliminates the problem of humidity which arises in the case of wood frames.

In FIGS. 4 and 5, the general arrangement of the supporting frame described above is again met with but differs therefrom, however, in that the oblique wires, which in this example are designated by the reference 11, are provided with elbows or undulations having a long radius which permit of continuous production of said wires on a suitable machine. Said oblique wires serve to interconnect, on the one hand, the lower flat network which consists of the steel wires 14 and 15 and, on the other hand, the upper flat network which consists of the steel wires 12 and 13.

In the alternative form which is illustrated in FIG. 6, the oblique wires which are designated by the reference 11a are provided with elbowed portions (having a more or less sharp angle of elbow), the characteristic feature of this alternative form being that one elbow out of two is dispensed with, thus permitting of economy in the length of the steel wires.

In the example of construction shown in FIGS. 7 and 8, the wood battens which are designated in this case by the reference numerals 18 and 19 are bare and the wires 14 and 15 of the lower flat network of the supporting frame rest directly on said battens. Each longitudinal side wires 15 of this network is laid over the wires 14 and is in turn located beneath the ends of the oblique wires 11; the complete asesmbly is secured to said wood batten 19 by means of staples 20.

A similar arrangement is employed in the case of the short sides, as can be seen from FIGS. 9 and 10, in which the bare wood batten has been designated by the reference 18. However, said batten is provided with a lengthwise groove 21 in which the cross-wire 14 can be fitted with play while the longitudinal wires 15 rest directly on the top face of the aforesaid batten and receive the lower extremities of the oblique connecting wires 11. In this case also, the different elements are fixed to the wood batten 18 by means of staples 22 and 23.

Instead of the panels mentioned above, each end of the supporting frame can be provided (as shown in FIGS. 11 to 14) with triangular corner-brackets 24 which are secured by any suitable means (for example by welding) to two of the last cross-wires 14 of the lower flat network. Said corner-brackets can be provided with fittings or guides of the usual type for the sliding engagement therein of counterguides which are fixed in the usual manner to the head-board which is designated in this example by the reference 25.

Each triangular corner-bracket 24 can be used for the purpose of fixing a foot 27, preferably by means of a split ring 26, the flexibility of which makes it possible to mount said foot on the corner-bracket in a removable manner. In an alternative form, the feet could be screwed directly onto the triangular corner-brackets 24.

Lateral right-angle brackets 28 are secured to the two longitudinal side wires 15 which are located on each side of the supporting frame and can be employed if necessary for the purpose of fixing decorative fittings thereon. The ticking or cotton fabric 35 with which the mattress is covered conceals the corner-brackets 24 and the right-angle bracket 28.

The mattress springs can be mounted in a large number of different ways on the supporting frame which forms the main object of the invention.

Figure 15:
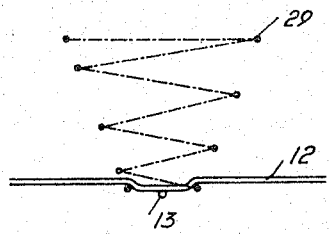
FIG. 15 is a side view in partial cross-section showing the assembly of a cone spring on the upper flat network of the supporting frame.
Figure 16:
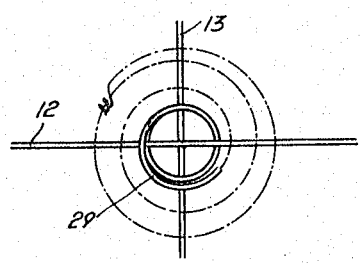
FIG. 16 is a plan view of FIG. 15.

In FIGS. 15 and 16, the small base of the spring, which is designated by the reference 29 and which is in this case a cone spring (or double-cone spring), is engaged with two wires 12 and 13 of the network which forms the upper surface of the supporting frame, while the last turn of the spring is, for example, simply welded to the said wires.

Figure 17:
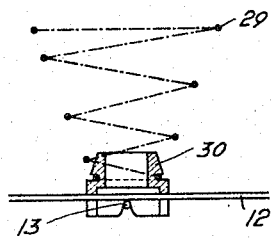
FIG. 17 is a view in part-sectional elevation showing the assembly of a cone spring of the mattress on a spring seating member which is attached to the upper flat network of the supporting frame.
Figure 18:
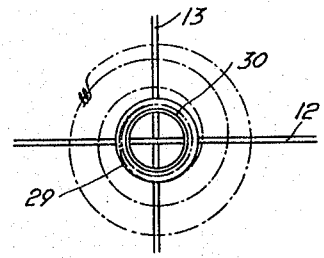
FIG. 18 is a plan view of FIG. 17.

In the alternative form which is illustrated in FIGS. 17 and 18, the extremity of the spring is engaged within the circular groove of a spring seating member 30 which is mounted astride the wires 12 and 13, at the point of intersection of said wires. Said spring seating member can be formed of plastic material, of metal and the like.

Figure 19:
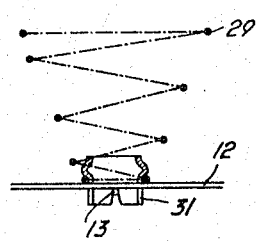
FIG. 19 is a view which is similar to FIG. 17 and showing an alternative form of spring seating member.
Figure 20:
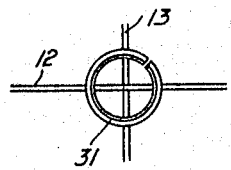
FIG. 20 is a plan view of FIG. 19.

In the alternative form FIGS. 19 and 20, the spring seating member, which is designated in this example by the reference numeral 31, is a split metal ring which has a certain degree of flexibility and which is mounted astride the wires 12 and 13. Said ring, which need not necessarily be a split ring, is provided with an annular bulge for the purpose of securing thereon the lower extremity of the spring 29.

Figure 21:
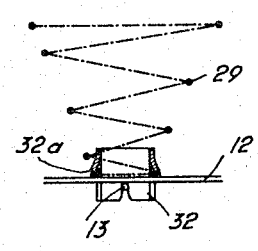
FIG. 21 is a view which is similar to FIG. 19 and showing another alternative form of spring seating member.
Figure 22:
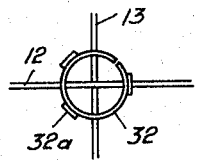
FIG. 22 is a plan view of FIG. 21.

In FIGS. 21 and 22, the spring seating member is an open metallic ring 32 which is mounted in the same manner as the spring seating member 30 over the wires 12 and 13 of the upper flat network of the supporting frame, but the annular bulge of the previous example is in this case replaced by punched-out portions which are designated by the reference 32a.

Figure 23:
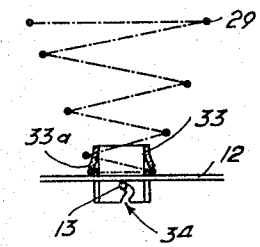
FIG. 23 is a view which is similar to FIGS. 19 and 21 and showing another alternative form of the spring seating member.
Figure 24:
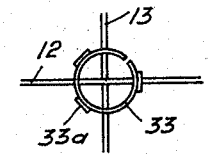
FIG. 24 is a plan view of FIG. 23.
Figure 25:
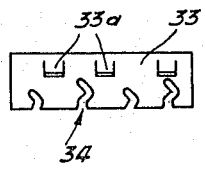
FIG. 25 is a developed view of the spring seating member of FIGS. 23 and 24.

In the alternative form of embodiment which is illustrated in FIGS. 23, 24 and 25, the spring seating member is again an open metallic ring 33 in which are formed punched-out portions 33a for the purpose of securing the spring 29. In this case, however, the spring seating member is provided with a system of slots 34 which are designed to permit of a bayonet-type fixation on the wires 12 and 13.

It will be apparent that the modes of application of the improvements as hereinabove described and as illustrated in the accompanying drawings have been given solely by way of non-limitative example and that any and all detail modifications can be made therein without consequently departing either from the scope or the spirit of the invention.

What I claim is:

1. A box-mattress comprising a substantialy even carrying base member and a layer of coil-springs mounted thereon, said base member being formed of a lightweight metallic self-supporting open-work comprising two substantially plane lattices, parallel to each other and distant from one another, and distance-pieces located between said lattice and fastened thereto, said coil-springs being mounted on one of said lattices, outside the metallic open-work, each of said lattices comprising a series of longitudinal filiform members parallel to each other and a series of transverse filiform members parallel to each other secured to said longitudinal members forming therewith a network having meshes, the members of one of said lattices being parallel to the members of the other of said lattices and the meshes of one of said lattices being shifted with respect to the meshes of the other of said lattices, each of said distance-pieces being an undulated wire located in a plane forming a flat cross-piece, each pair of parallel filiform members of one of said lattices being connected with the nearest parallel filiform members of the other of said lattices by means of two of said flat distance-pieces, the planes of which together form a dihedral.

2. A box-mattress according to claim 1, wherein said filiform members of one of said series of filiform members are undulated at the points where said filiform members are secured to said filiform members of the other of said series, whereby a gap is formed at each of said points to receive one end of one of said coil-springs.

References Cited by the Examiner

UNITED STATES PATENTS

| | | | |
|---|---|---|---|
| 944,518 | 12/1909 | Staples | 5—266 |
| 1,285,063 | 11/1918 | D'Arcy | 5—266 |
| 1,714,227 | 5/1929 | Lathrop | 5—226 |
| 1,724,946 | 8/1929 | MacInerny | 5—266 |
| 2,058,165 | 10/1936 | McCoy | 5—351 X |
| 2,061,725 | 11/1936 | Wesley | 5—266 |
| 2,889,562 | 6/1959 | Gleason | 5—235 X |
| 2,909,216 | 10/1959 | Stern, et al. | 5—266 X |
| 2,979,739 | 4/1961 | Krakauer | 5—235 |
| 3,160,381 | 12/1964 | Langbaum | 248—188 |

FRANK B. SHERRY, *Primary Examiner.*

CASMIR A. NUNBERG, *Examiner.*